(12) United States Patent
Twitchell, Jr.

(10) Patent No.: US 7,742,773 B2
(45) Date of Patent: *Jun. 22, 2010

(54) USING GPS AND RANGING TO DETERMINE RELATIVE ELEVATION OF AN ASSET

(75) Inventor: Robert W. Twitchell, Jr., Cumming, GA (US)

(73) Assignee: Terahop Networks, Inc., Alpharetta, GA (US)

( * ) Notice: Subject to any disclaimer, the term of this patent is extended or adjusted under 35 U.S.C. 154(b) by 619 days.

This patent is subject to a terminal disclaimer.

(21) Appl. No.: 11/555,173

(22) Filed: Oct. 31, 2006

(65) Prior Publication Data

US 2007/0099629 A1    May 3, 2007

Related U.S. Application Data

(60) Provisional application No. 60/596,930, filed on Oct. 31, 2005.

(51) Int. Cl.
*H04W 24/00* (2009.01)

(52) U.S. Cl. .............. 455/456.1; 455/404.1; 455/404.2; 455/456.6; 342/118; 342/126; 342/139; 342/140

(58) Field of Classification Search ................ 455/456.1
See application file for complete search history.

(56) References Cited

U.S. PATENT DOCUMENTS

| | | | |
|---|---|---|---|
| 3,805,265 | A | 4/1974 | Lester |
| 4,165,024 | A | 8/1979 | Oswalt et al. |
| 4,613,990 | A | 9/1986 | Halpern |
| 4,680,583 | A | 7/1987 | Grover |
| 4,688,244 | A | 8/1987 | Hannon et al. |
| 4,750,197 | A | 6/1988 | Denekamp et al. |
| 4,817,537 | A | 4/1989 | Cripe et al. |

(Continued)

FOREIGN PATENT DOCUMENTS

EP    0467036 A2    1/1992

(Continued)

OTHER PUBLICATIONS

Information Disclosure Statement (IDS) Letter Regarding Common Patent Application(s) submitted Apr. 13, 2009.

(Continued)

*Primary Examiner*—Rafael Pérez-Gutiérrez
*Assistant Examiner*—Daniel Nobile
(74) *Attorney, Agent, or Firm*—Tillman Wright, PLLC; Chad D. Tillman; Jeremy C. Doerre

(57) ABSTRACT

A system and method are disclosed for determining a position of a wireless communication device. A method includes determining a respective (x,y) position of two wireless communication devices, determining a distance between the two wireless communication devices, and determining a relative elevational differential between the two wireless communication devices. The relative elevational differential is determined based on the determined (x,y) positions of the two wireless communication devices and the determined distance between the first and second wireless communication devices. The (x,y) positions may be determined using GPS receivers incorporated in the wireless communication devices. Determining the distance between the devices may be accomplished using RF ranging. The relative elevational differential may be derived using the Pythagorean theorem.

19 Claims, 14 Drawing Sheets

U.S. PATENT DOCUMENTS

| | | |
|---|---|---|
| 5,040,238 A | 8/1991 | Comroe et al. |
| 5,054,052 A | 10/1991 | Nonami |
| 5,117,501 A | 5/1992 | Childress et al. |
| 5,129,096 A | 7/1992 | Burns |
| 5,210,540 A | 5/1993 | Masumoto |
| 5,265,025 A | 11/1993 | Hirata |
| 5,295,154 A | 3/1994 | Meier et al. |
| 5,331,637 A | 7/1994 | Francis et al. |
| 5,369,784 A | 11/1994 | Nelson |
| 5,400,254 A | 3/1995 | Fujita |
| 5,425,051 A | 6/1995 | Mahany |
| 5,442,758 A | 8/1995 | Slingwine et al. |
| 5,511,232 A | 4/1996 | O'Dea et al. |
| 5,565,858 A | 10/1996 | Guthrie |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,606,313 A | 2/1997 | Allen et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,077 A | 3/1998 | Whitehead |
| 5,761,195 A | 6/1998 | Lu et al. |
| 5,790,946 A | 8/1998 | Rotzoll |
| 5,793,882 A | 8/1998 | Piatek et al. |
| 5,833,910 A | 11/1998 | Teixido |
| 5,862,803 A | 1/1999 | Besson |
| 5,890,054 A | 3/1999 | Logsdon et al. |
| 5,892,441 A | 4/1999 | Woolley et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,951,613 A | 9/1999 | Sahm et al. |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,928 A | 10/2000 | Issacman |
| 6,127,976 A | 10/2000 | Boyd et al. |
| 6,134,587 A | 10/2000 | Okanoue |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,437,692 B1 | 8/2002 | Petite |
| 6,473,607 B1 | 10/2002 | Shohara et al. |
| 6,476,708 B1 | 11/2002 | Johnson |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,587,755 B1 | 7/2003 | Smith et al. |
| 6,600,418 B2 | 7/2003 | Sainati et al. |
| 6,611,556 B1 | 8/2003 | Koerner et al. |
| 6,614,349 B1 | 9/2003 | Proctor et al. |
| 6,617,962 B1 | 9/2003 | Horwitz et al. |
| 6,665,585 B1 | 12/2003 | Kawase |
| 6,700,533 B1 | 3/2004 | Werb et al. |
| 6,720,888 B2 | 4/2004 | Eagleson et al. |
| 6,737,974 B2 | 5/2004 | Dickinson |
| 6,745,027 B2 | 6/2004 | Twitchell, Jr. |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Zhou et al. |
| 6,919,803 B2 | 7/2005 | Breed |
| 6,927,688 B2 | 8/2005 | Tice |
| 6,934,540 B2 | 8/2005 | Twitchell |
| 6,940,392 B2 | 9/2005 | Chan et al. |
| 6,975,614 B2 | 12/2005 | Kennedy |
| 6,999,780 B1 * | 2/2006 | Zhao ................. 455/456.5 |
| 7,012,529 B2 | 3/2006 | Sajkowsky |
| 7,027,773 B1 | 4/2006 | McMillin |
| 7,088,229 B2 | 8/2006 | Johnson |
| 7,098,784 B2 | 8/2006 | Easley et al. |
| 7,103,344 B2 | 9/2006 | Menard |
| 7,126,470 B2 | 10/2006 | Clift et al. |
| 7,133,704 B2 | 11/2006 | Twitchell, Jr. |
| 7,142,121 B2 | 11/2006 | Chan et al. |
| 7,155,264 B2 | 12/2006 | Twitchell, Jr. |
| 7,191,934 B2 | 3/2007 | Miller et al. |
| 7,196,622 B2 | 3/2007 | Lambright et al. |
| 7,200,132 B2 | 4/2007 | Twitchell, Jr. |
| 7,209,468 B2 | 4/2007 | Twitchell, Jr. |
| 7,209,771 B2 | 4/2007 | Twitchell |
| 7,212,122 B2 | 5/2007 | Gloekler et al. |
| 7,221,668 B2 | 5/2007 | Twitchell, Jr. |
| 7,230,933 B2 | 6/2007 | Bahl et al. |
| 7,233,284 B2 | 6/2007 | Velicer |
| 7,282,944 B2 | 10/2007 | Gunn et al. |
| 7,313,421 B2 | 12/2007 | Dejanovic |
| 7,315,281 B2 | 1/2008 | Dejanovic |
| 7,319,397 B2 | 1/2008 | Chung |
| 7,340,260 B2 * | 3/2008 | McAlexander ........... 455/456.1 |
| 7,348,875 B2 | 3/2008 | Hughes et al. |
| 7,349,803 B2 | 3/2008 | Belenkii et al. |
| 7,349,804 B2 | 3/2008 | Belenkii et al. |
| 7,376,507 B1 | 5/2008 | Daily et al. |
| 7,391,321 B2 | 6/2008 | Twitchell |
| 7,440,781 B2 | 10/2008 | Beach et al. |
| 2001/0000019 A1 | 3/2001 | Bowers et al. |
| 2001/0050550 A1 | 12/2001 | Yoshida et al. |
| 2002/0039896 A1 | 4/2002 | Brown |
| 2002/0050932 A1 | 5/2002 | Rhoades et al. |
| 2002/0089434 A1 | 7/2002 | Ghazarian |
| 2002/0098861 A1 | 7/2002 | Doney et al. |
| 2002/0119770 A1 | 8/2002 | Twitchell, Jr. |
| 2002/0146985 A1 | 10/2002 | Naden |
| 2003/0008692 A1 | 1/2003 | Phelan |
| 2003/0083064 A1 | 5/2003 | Cooper |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0182077 A1 | 9/2003 | Emord |
| 2003/0209601 A1 | 11/2003 | Chung |
| 2003/0236077 A1 | 12/2003 | Sivard |
| 2004/0021572 A1 | 2/2004 | Schoen et al. |
| 2004/0033808 A1 * | 2/2004 | Rorabaugh ................ 455/456.1 |

| | | | |
|---|---|---|---|
| 2004/0041731 | A1 | 3/2004 | Hisano |
| 2004/0082296 | A1 | 4/2004 | Twitchell, Jr. |
| 2004/0100394 | A1 | 5/2004 | Hitt |
| 2004/0100415 | A1 | 5/2004 | Veitch et al. |
| 2004/0119588 | A1 | 6/2004 | Marks |
| 2004/0121793 | A1 | 6/2004 | Weigele et al. |
| 2004/0135691 | A1 | 7/2004 | Duron et al. |
| 2004/0183673 | A1 | 9/2004 | Nageli |
| 2004/0229631 | A1* | 11/2004 | George .................. 455/456.1 |
| 2004/0232924 | A1 | 11/2004 | Hilleary et al. |
| 2004/0233041 | A1 | 11/2004 | Bohman et al. |
| 2004/0233054 | A1 | 11/2004 | Neff et al. |
| 2004/0246463 | A1 | 12/2004 | Milinusic |
| 2005/0002481 | A1* | 1/2005 | Woo et al. .................. 375/354 |
| 2005/0043068 | A1 | 2/2005 | Shohara et al. |
| 2005/0073406 | A1 | 4/2005 | Easley et al. |
| 2005/0087235 | A1 | 4/2005 | Skorpik |
| 2005/0088299 | A1 | 4/2005 | Bandy et al. |
| 2005/0090211 | A1 | 4/2005 | Lilja et al. |
| 2005/0093702 | A1 | 5/2005 | Twitchell, Jr. |
| 2005/0093703 | A1 | 5/2005 | Twitchell, Jr. |
| 2005/0128080 | A1 | 6/2005 | Hall et al. |
| 2005/0145018 | A1 | 7/2005 | Sabata et al. |
| 2005/0146445 | A1 | 7/2005 | Sleboda et al. |
| 2005/0190759 | A1 | 9/2005 | Lee et al. |
| 2005/0199716 | A1 | 9/2005 | Shafer et al. |
| 2005/0215280 | A1 | 9/2005 | Twitchell, Jr |
| 2005/0226201 | A1 | 10/2005 | McMillin |
| 2005/0246133 | A9 | 11/2005 | Mann |
| 2005/0261037 | A1 | 11/2005 | Raghunath et al. |
| 2005/0270160 | A1 | 12/2005 | Chan et al. |
| 2006/0022872 | A1* | 2/2006 | Zimmerman ................ 342/464 |
| 2006/0109106 | A1 | 5/2006 | Braun |
| 2006/0114102 | A1 | 6/2006 | Chang et al. |
| 2006/0132485 | A1 | 6/2006 | Milinusic |
| 2006/0135145 | A1 | 6/2006 | Redi |
| 2006/0163422 | A1 | 7/2006 | Krikorian et al. |
| 2006/0164232 | A1 | 7/2006 | Waterhouse et al. |
| 2006/0164239 | A1 | 7/2006 | Loda |
| 2006/0270382 | A1 | 11/2006 | Lappetelainen et al. |
| 2006/0287822 | A1 | 12/2006 | Twitchell |
| 2007/0001898 | A1 | 1/2007 | Twitchell |
| 2007/0004330 | A1 | 1/2007 | Twitchell |
| 2007/0004331 | A1 | 1/2007 | Twitchell |
| 2007/0008408 | A1 | 1/2007 | Zehavi |
| 2007/0032951 | A1 | 2/2007 | Tanenhaus et al. |
| 2007/0040732 | A1* | 2/2007 | Burgett et al. ................ 342/120 |
| 2007/0099628 | A1 | 5/2007 | Twitchell |
| 2007/0135179 | A1 | 6/2007 | Hardman et al. |
| 2008/0096583 | A1* | 4/2008 | Karaoguz et al. ........... 455/457 |
| 2008/0264888 | A1 | 10/2008 | Zakula et al. |
| 2008/0309550 | A1* | 12/2008 | Sairo et al. ............... 342/357.1 |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 0944014 | 9/1999 |
| EP | 1317733 A2 | 6/2003 |
| EP | 1692599 A2 | 8/2006 |
| EP | 1692668 A2 | 8/2006 |
| GB | 2308947 | 7/1997 |
| KR | 2005-0102419 | 10/2005 |
| KR | 2007-0005515 A | 1/2007 |
| WO | WO0068907 | 11/2000 |
| WO | WO0069186 | 11/2000 |
| WO | 03098175 | 11/2003 |

OTHER PUBLICATIONS

Gary Morgan, Miniature Tags Provide Visibility & Cohesion for an LIA Battalion Level 'Proof of Principle', Pacific NW National Laboratory, Apr. 2001, Gary.morgan@pnl.gov.

Ben Sommer et al., Group 4, Passive RF Tags.

Kevin Sharp, Physical Reality: A Second Look, Supply Chain Systems, http://www.idsystems.com/reader/1999_03/phys0399_pt2/index.htm, Mar. 1999, Helmers Publishing, Inc.

U.S. Appl. No. 60/444,029, of Nageli, filed Jan. 31, 2003.

Ram Ramanathan et al., Hierarchically-Organized, Multihop Mobile Wireless Networks for Quality-of-Service Support, pp. 1-35, 1998.

Guangyu Pei et al., Mobility Management in Hierarchical Multi-hop Mobile Wireless Networks, 6 pages, 1999.

http://www/iprg/nokia.com/charliep/txt/manet/term.txt, Mobile Ad Hoc Networking Terminology, C. Perkins, Nov. 17, 1998, visited Nov. 13, 2000.

Daniel Lihui Gu et al., C-ICAMA, A Centralized Intelligent Channel Assigned Multiple Access for Multi-Layer Ad-Hoc Wireless Networks with UAVs, 6 pages, 2000.

Atsushi Iwata, et al., Scalable Routing Strategies for Ad Hoc Wireless Networks, IEEE Journal on Selected Areas in Communications, vol. 17, No. 8, Aug. 1999, pp. 1369-1379.

http://www.cs.ucla.edu/NRL/wireless/PAPER/draft-ietf-manet-admrp-02.txt, Sung-Ju Lee et al., On-Demand Multicast Routing Protocol (ODMRP) for Ad Hoc Networks, Jan. 2000, visited Nov. 13, 2000.

Guangyu Pei, et al., A Wireless Hierarchical Routing Protocol with Group Mobility, 1998 IEEE, 5 pages.

Charles E. Perkins, AD HOC Networks, Jan. 2001, table of contents, chapters 1, 4, and 11.

J.J. Gardia-Luna-Aceves et al., Source-Tree Routing in Wireless Networks, 1999, 10 pages.

Jean-Pierre Hubaux et al., Toward Self-Organized Mobile Ad Hoc Networks: The Terminodes Project, IEEE Communications Magazine, Jan. 2001, pp. 118-124.

Jaap Haartsen et al., Bluetooth: Vision, Goals, and Architecture, Mobile Computing & Communications Review, vol. 1, No. 2, 1998, 8 pages.

Jaap Haartsen, Bluetooth-The Universal Radio Interface for Ad Hoc, Wireless Connectivity, Ericsson Review No. 3, pp. 110-117, 1998.

Ezio Valdevit, Cascading in Fibre Channel: How to Build a Multi-Switch Fabric, pp. 1-12.

Daniel Lihui Gu et al., Hierarchical Routing for Multi-Layer Ad-Hoc Wireless Networks with UAV's, 5 pages, 2000.

U.S. Appl. No. 60/499,338, of Easley et al., filed Sep. 3, 2003.

Keshavarzian et al., Energy-Efficient Link Assessment in Wireless Sensor Networks, INFOCOM 2004. 23rd Annual Joint Conference of the IEEE Computer and Communications Societies, vol. 3, 2004, pp. 1751-1761.

Stojmenovic et al., Design Giudelines for Routing Protocols in Ad Hoc and Sensor Networks with a Realistic Physical Layer, Communications Magazine, IEEE, vol. 43, Issue 3, March 2005, pp. 101-106.

Melodia et al., On the Interdependence of Distributed Topology Control and Geographical Routing in Ad Hoc and Sensor Networks, Selected Areas in Communications, IEEE Journal, vol. 23, Issue 3, Mar. 2005, pp. 520-532.

"Scalable Routing Strategies for Ad hoc Wireless Networks", Atsushi Iwata et al., IEEE Journal on Selected Areas in Communications, Special Issue on Adhoc Networks, Aug. 1999, pp. 1369-1379.

"Cluster Based Routing Protocol", Internet-Draft Mingliang, Jiang et al., National University of Singapore, Jul. 1999.

* cited by examiner

- GPS RADIO

Horizontal Plane View

Where
    A is the horizontal distance between the radios
    $x_1, y_1, x_2, y_2$ are the horizontal plane coordinates of the radios Vertical Plane View Where
R is the range or distance between the radios
$x_1, y_1, x_2, y_2$ are the horizontal plane coordinates of the radios
$z_1, z_2$ are the vertical coordinates of the radios

— GPS RADIO

- GPS RADIO

USING GPS AND RANGING TO DETERMINE RELATIVE ELEVATION OF AN ASSET

I. CROSS-REFERENCE TO RELATED APPLICATIONS

The present application is a nonprovisional of, and claims priority under 35 U.S.C. §119(e) to, Twitchell U.S. Provisional Patent Application No. 60/596,930 filed Oct. 31, 2005. The entire disclosure of this patent application is hereby incorporated herein by reference.

II. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

III. BACKGROUND OF THE INVENTION

Transceivers and other radio devices, often referred to generally as "radios," are used in a wide variety of contexts. In many cases, the radios are portable and are intended to be carried by a person, a vehicle, or other equipment from one place to another. Determining the exact location of a person or object associated with a particular radio can be important in some circumstances, and in some cases, finding the exact location within a specified area is critical. For example, for firefighters, knowing their exact location including floor of a multistory building can be a life or death situation.

Several methods are known for determining locations of radios. For example, a position can be obtained within a building using triangulation, and if the known positioned radios are placed properly, the position of the desired radio can be calculated. The main issue is that placing these radios is difficult since knowledge a priori of the general area is usually not known. To limit the number of radios involved would be of great value, but a precise calculation is critical. Alternatively, a satellite navigation system, such as GPS, may be used to determine the location of a GPS-equipped radio without any other radios being present. Unfortunately, although the (x,y) position of a GPS-equipped radio may be calculated reasonably accurately, GPS-based calculations of the z position are not very accurate. This leaves the user with the knowledge, for example, that the radio is a particular quadrant of a particular building, but the user does not know whether the radio is on the $1^{st}$ floor or the $10^{th}$ floor.

IV. SUMMARY OF THE INVENTION

The present invention includes many aspects and features.

In accordance with a first aspect of the present invention, a method for determining a position of a wireless communication device includes: (a) determining an (x,y) position of a first wireless communication device; (b) determining an (x,y) position of a second wireless communication device; (c) determining a distance between the first wireless communication device and the second wireless communication device; and (d) determining a relative elevational differential between the first wireless communication device and the second wireless communication device based on, (i) the determined (x,y) positions of the first and second wireless communication devices, and (ii) the determined distance between the first and second wireless communication devices.

In features of this aspect, the (x,y) position of the first wireless communication device is determined using a satellite navigation system, which may be a GPS system; the (x,y) position of the second wireless communication device is determined using a satellite navigation system; the distance between the first wireless communication device and the second wireless communication device is determined using radio frequency ranging; the relative elevational differential between the first wireless communication device and the second wireless communication device is determined by calculating the square root of (i) the square of the determined distance between the first wireless communication device and the second wireless communication device less (ii) the square of the distance in the X-Y plane between the first wireless communication device and the second wireless communication device; determining at least one of the respective steps of determining an (x,y) position of the first and second wireless devices is carried out with the assistance of network aiding to help in the determination of (x,y,) position; and the determined relative elevational differential is an absolute magnitude, wherein the method further includes determining, separately from the determination of the relative elevational differential, the direction, relative to the first wireless communication device, in which the determined relative elevational differential is to be applied.

In accordance with a second aspect of the present invention, a method for determining a position of a wireless communication device includes: (a) determining an (x,y) position of a first wireless communication device; (b) determining an (x,y) position of a second wireless communication device; (c) determining a distance between the first wireless communication device and the second wireless communication device; and (d) determining a (z) position of the first wireless communication device; (e) determining a (z) position of the second wireless communication device based on, (i) the determined (x,y) positions of the first and second wireless communication devices, (ii) the determined distance between the first and second wireless communication devices, and (iii) the determined (z) position of the first wireless communication device.

In features of this aspect, the (x,y) position of the first wireless communication device is determined using a satellite navigation system, which may be a GPS system; the (x,y) position of the second wireless communication device is determined using a satellite navigation system; the distance between the first wireless communication device and the second wireless communication device is determined using radio frequency ranging; and the relative elevational differential between the first wireless communication device and the second wireless communication device is determined by calculating the square root of (i) the square of the determined distance between the first wireless communication device and the second wireless communication device less (ii) the square of the distance in the X-Y plane between the first wireless communication device and the second wireless communication device.

In another feature of this aspect, determining the (z) position of the first wireless communication device includes determining the (z) position of the first wireless communication device relative to the ground, and wherein determining the (z) position of the second wireless communication device includes adding the (z) position of the first wireless communication system to a relative elevational differential determined between the first and second wireless communication devices. In still another feature of this aspect, determining the (z) position of the first wireless communication device includes determining the (z) position of the first wireless communication device relative to sea level, and wherein determining the (z) position of the second wireless communication device includes adding the (z) position of the first wireless communication system to a relative elevational differential determined between the first and second wireless communication devices.

In accordance with a third aspect of the present invention, a method for determining a position of a wireless communication device includes: (a) determining an (x,y) position of a first wireless communication device; (b) determining an (x,y) position of a second wireless communication device; (c) determining a distance between the first wireless communication device and the second wireless communication device; (d) determining a relative elevational differential between the first wireless communication device and the second wireless communication device based on, (i) the determined (x,y) positions of the first and second wireless communication devices, and (ii) the determined distance between the first and second wireless communication devices; (e) determining an (x,y) position of a third wireless communication device; (f) determining a distance between the first wireless communication device and the third wireless communication device; (g) determining a relative elevational differential between the first wireless communication device and the third wireless communication device based on, (i) the determined (x,y) positions of the first and third wireless communication devices, and (ii) the determined distance between the first and third wireless communication devices.

In features of this aspect, the method further includes communicating the determined position of the third wireless communication device to the second wireless communication device; the method further includes determining a distance between the second wireless communication device and the third wireless communication device based on the determined distance between the first and second wireless communication devices and the determined distance between the first and third wireless communication devices; the (x,y) position of at least one of the first, second and third wireless communication devices is determined using a satellite navigation system, which may be a GPS system; and the distance between the first wireless communication device and the second wireless communication device, and the distance between the first wireless communication device and the third wireless communication device, are each determined using radio frequency ranging.

In accordance with a fourth aspect of the present invention, a method of determining the floor of a building on which a first person carrying a first wireless communication device is located relative to a second wireless communication device includes: (a) determining an (x,y) position of the first wireless communication device; (b) determining an (x,y) position of the second wireless communication device; (c) determining a distance between the first wireless communication device and the second wireless communication device; and (d) determining a relative elevational differential between the first wireless communication device and the second wireless communication device based on, (i) the determined (x,y) positions of the first and second wireless communication devices, and (ii) the determined distance between the first and second wireless communication devices.

In a feature of this aspect, the first person is a first responder. In another feature of this aspect, the first person is a firefighters In yet another aspect of this aspect, the first person is a serviceperson.

In other features of this aspect, the method further includes the step of determining a relative elevational differential between the second wireless communication device and a floor of the building on which a second person, carrying the second wireless communication device, is located; and the method further includes determining the floor, of the building, on which the first person is located, on the basis of the floor on which the second person is located and the determined relative elevational differential between the first wireless communication device and the second wireless communication device.

In still other features of this aspect, the method further includes the step of determining the number of floors corresponding to the relative elevational differential between the first wireless communication device and the second wireless communication device; the (x,y) position of the first wireless communication device is determined using a satellite navigation system, which may be a GPS system; the (x,y) position of the second wireless communication device is determined using a satellite navigation system; the distance between the first wireless communication device and the second wireless communication device is determined using radio frequency ranging; the relative elevational differential between the first wireless communication device and the second wireless communication device is determined by calculating the square root of (i) the square of the determined distance between the first wireless communication device and the second wireless communication device less (ii) the square of the distance in the X-Y plane between the first wireless communication device and the second wireless communication device; determining at least one of the respective steps of determining an (x,y) position of the first and second wireless devices is carried out with the assistance of network aiding to help in the determination of (x,y,) position; and the determined relative elevational differential is an absolute magnitude, wherein the method further includes determining, separately from the determination of the relative elevational differential, the direction, relative to the first wireless communication device, in which the determined relative elevational differential is to be applied.

In accordance with a fifth aspect of the present invention, a method of determining the location of an asset carrying a first wireless communication device relative to a second wireless communication device includes: (a) determining an (x,y) position of the first wireless communication device; (b) determining an (x,y) position of the second wireless communication device; (c) determining a distance between the first wireless communication device and the second wireless communication device; and (d) determining a relative elevational differential between the first wireless communication device and the second wireless communication device based on, (i) the determined (x,y) positions of the first and second wireless communication devices, and (ii) the determined distance between the first and second wireless communication devices.

In a feature of this aspect, the asset is a motor vehicle. In another feature of this aspect, the asset is a motor vehicle parked on a floor of a multi-level garage.

In other features of this aspect, determining at least one of the respective steps of determining an (x,y) position of the first and second wireless devices is carried out with the assistance of network aiding to help in the determination of (x,y,) position; and the determined relative elevational differential is an absolute magnitude, wherein the method further includes determining, separately from the determination of the relative elevational differential, the direction, relative to the first wireless communication device, in which the determined relative elevational differential is to be applied.

In addition to the aforementioned aspects and features of the present invention, it should be noted that the present invention further includes the various possible combinations of such aspects and features.

V. BRIEF DESCRIPTION OF THE DRAWINGS

Further aspects, features, embodiments, and advantages of the present invention will become apparent from the following detailed description with reference to the drawings, wherein.

Figure 9A:
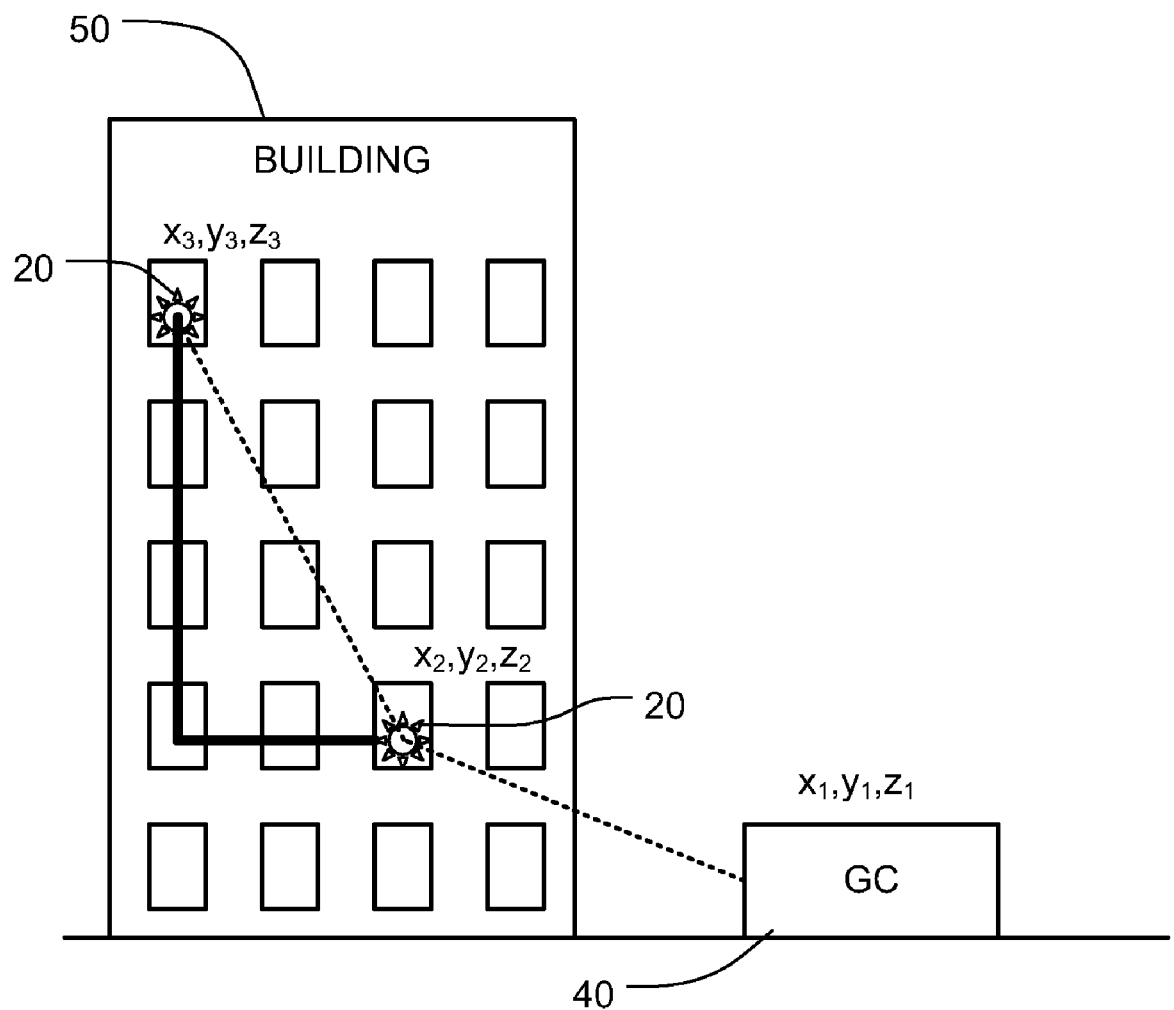
FIG. 9A illustrates a second operational mode in which a locator system is used to locate a GPS radio in a building.
Figure 9A:
Figure 9B:
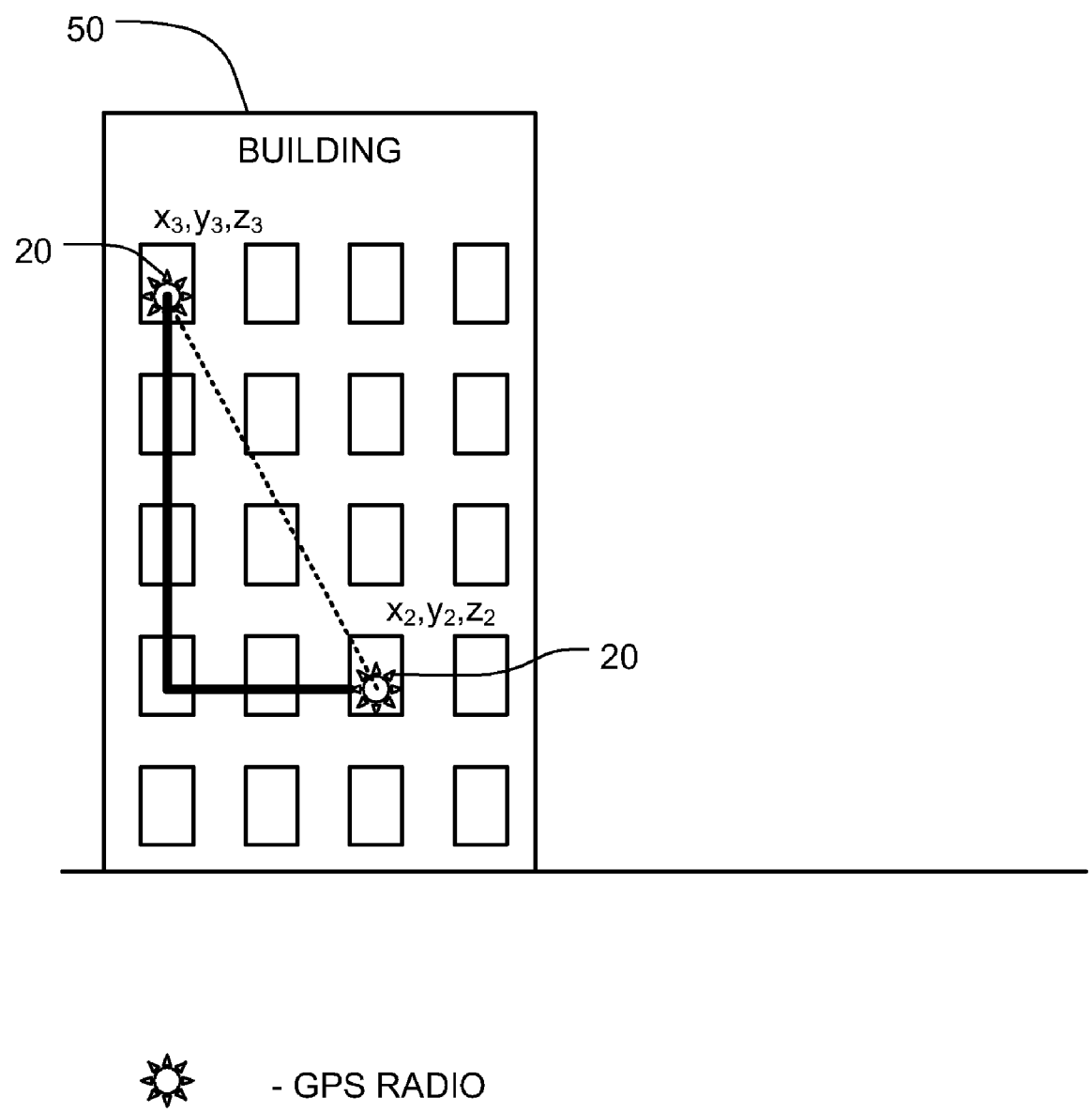
Figure 10:
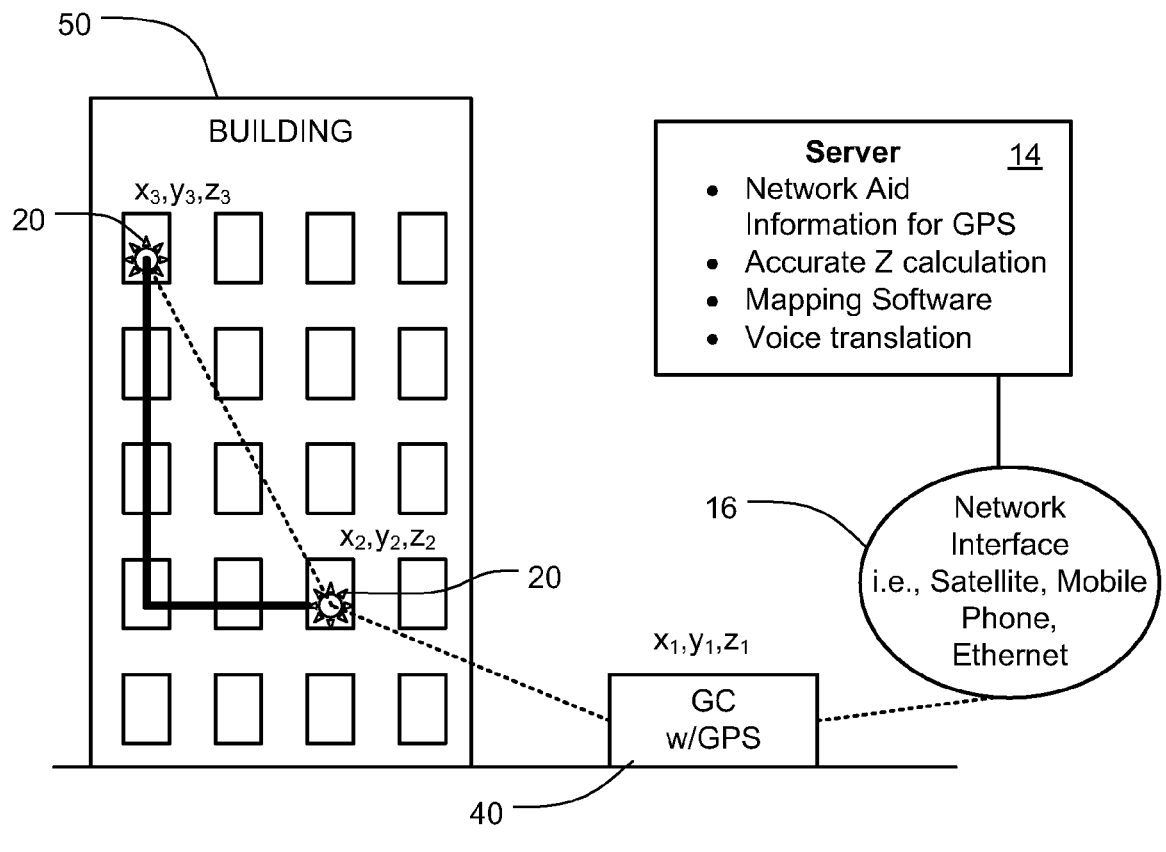
Figure 10:
Figure 11:
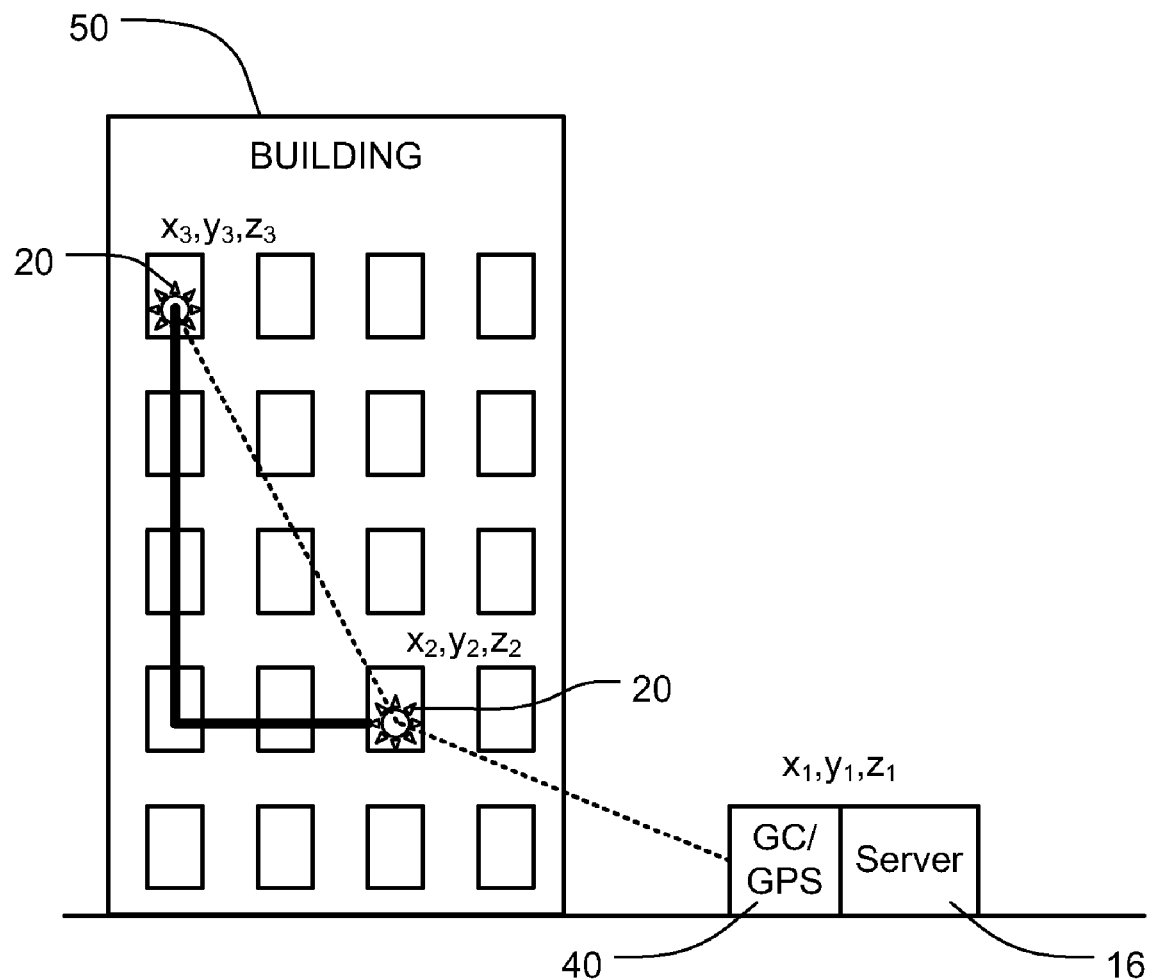
Figure 12:
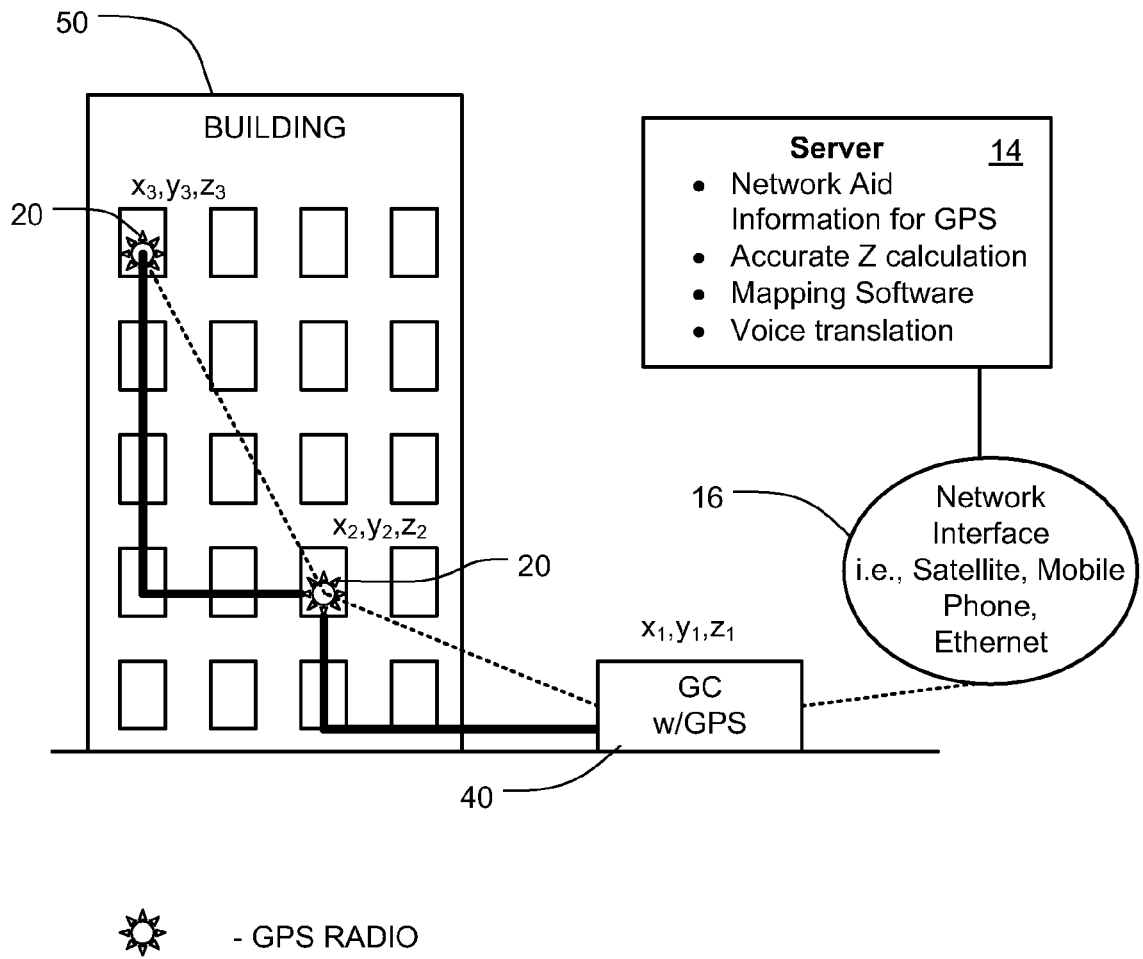
Figure 13:
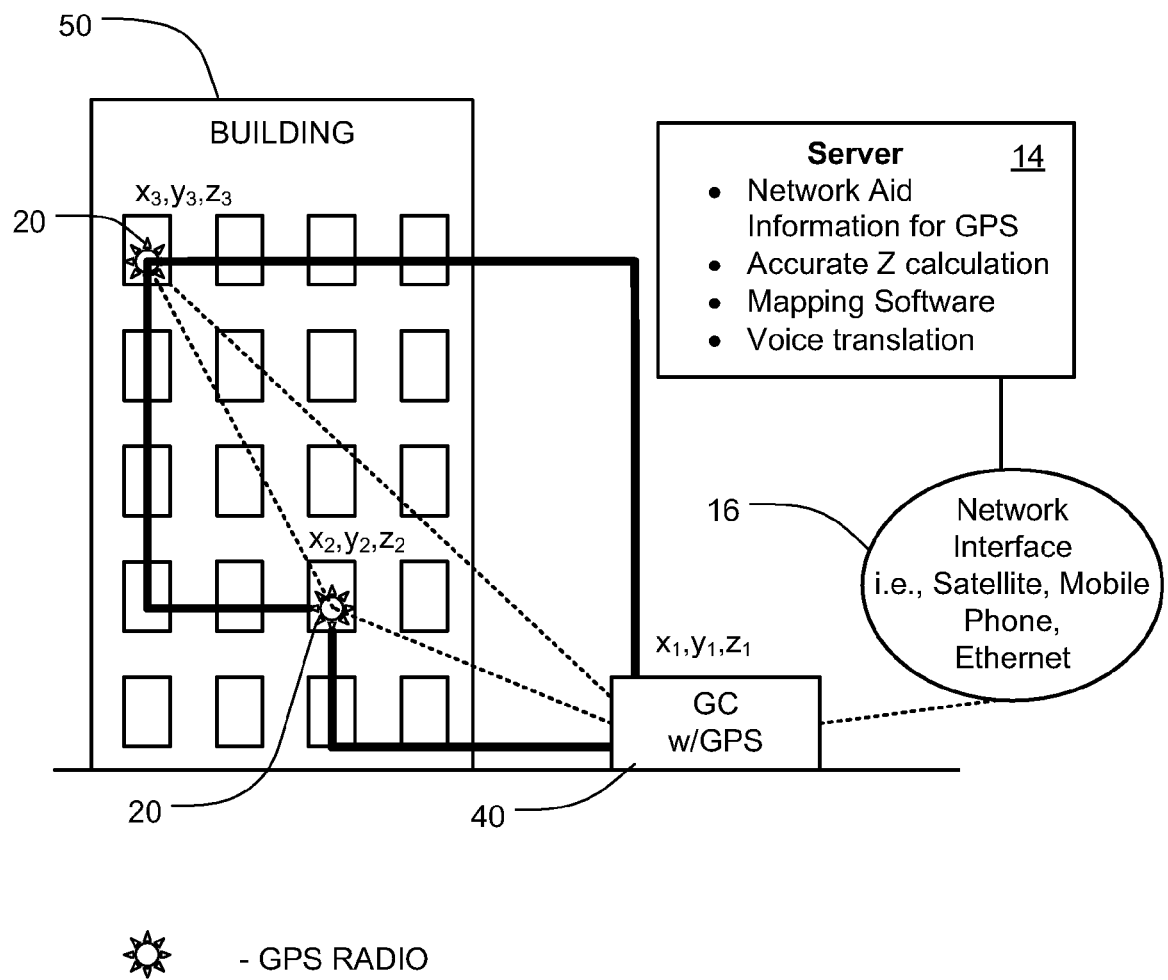

FIG. 9B further illustrates the second operational mode in which a locator system is used to locate a GPS radio in a building;

FIG. 10 illustrates a third operational mode in which a locator system is used to locate a GPS radio in a building;

FIG. 11 illustrates a fourth operational mode in which a locator system is used to locate a GPS radio in a building;

FIG. 12 illustrates a fifth operational mode in which a locator system is used to locate a GPS radio in a building; and FIG. 13 illustrates a sixth operational mode in which a locator system is used to locate a GPS radio in a building.

VI. DETAILED DESCRIPTION

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its applications, or uses.

Figure 1:
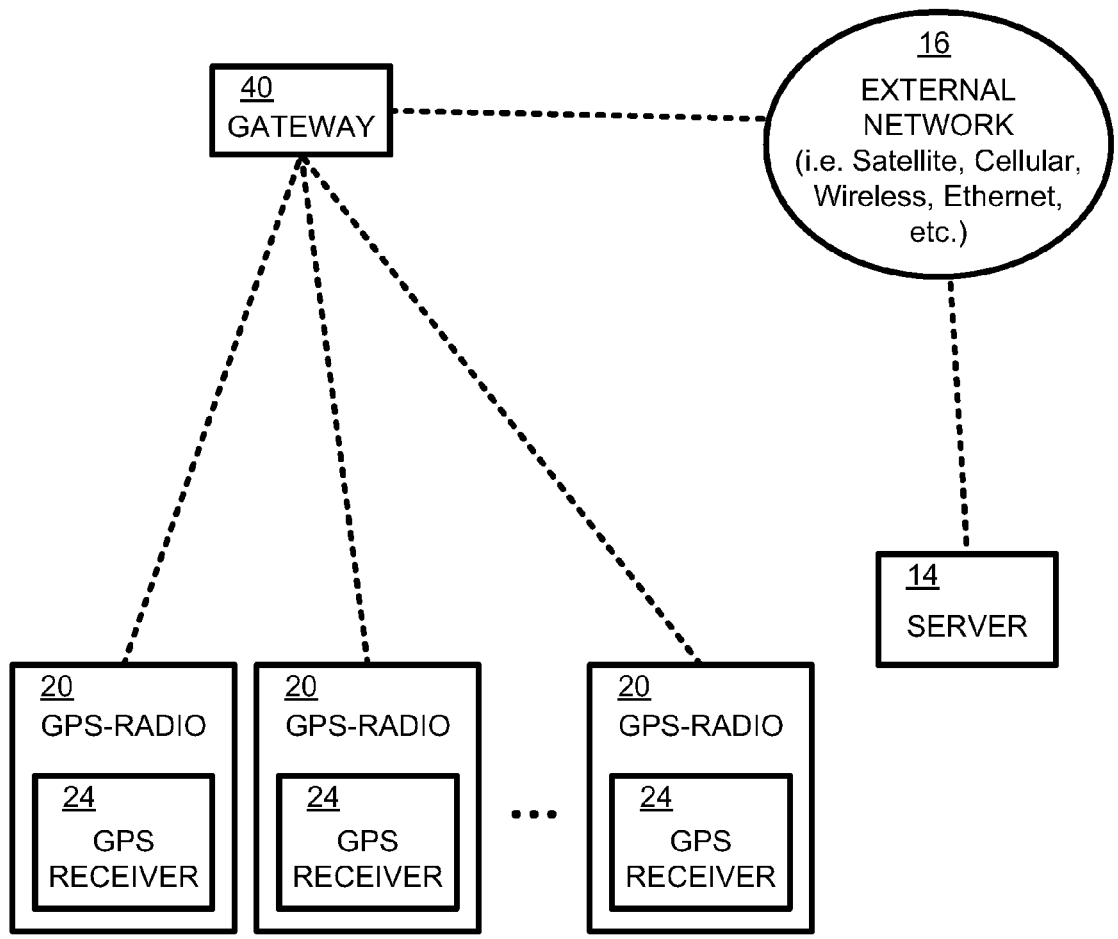
FIG. 1 is a block diagram of a GPS locator system in accordance with a preferred embodiment of the present invention.

FIG. 1 is a block diagram of a GPS-based radio locator system 10 in accordance with a preferred embodiment of the present invention. The locator system 10 comprises a plurality of radios 20, a gateway 40, an external network 16, and a computer management system 14. The radios 20 and the gateway 40 each comprises, for example, a communication node in one or more ad hoc wireless networks, some of which are described further hereinbelow. In this regard, the radios 20 and the gateway 40 may sometimes be referred to herein as "wireless communication devices." In addition, each radio 20 and the gateway 40 preferably includes a GPS receiver therewith. Each such radio 20 is generally referred to herein as a "GPS radio," and the gateway 40 is generally referred to herein as a "GPS gateway."

In at least one embodiment, the computer management system 14 primarily includes a server, and although different computer management system arrangements may be utilized, all arrangements will generally be referred to hereinafter as a "server."

Figure 2:
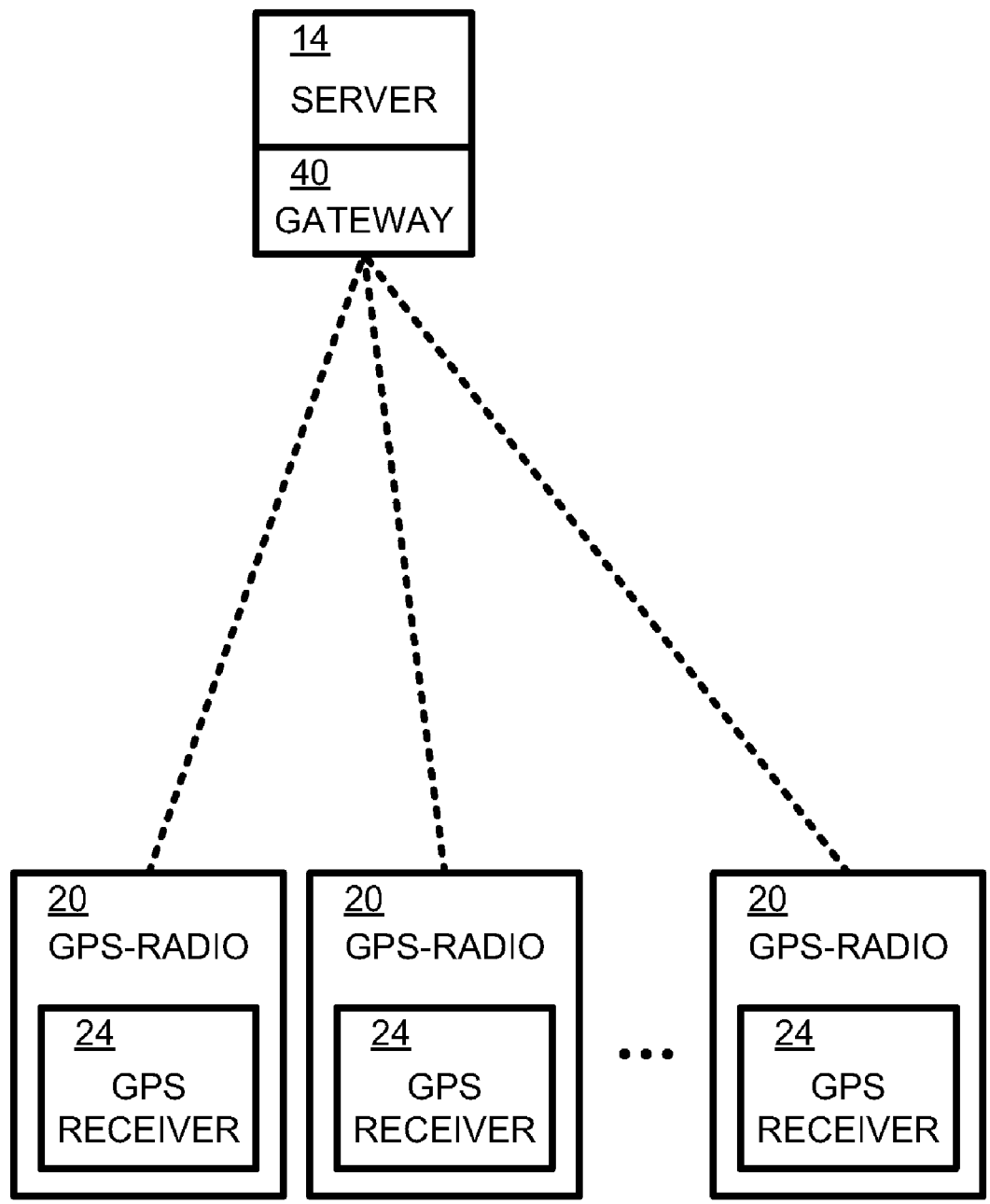
FIG. 2 is a block diagram of another GPS locator system.

Additionally, the server 14 may be physically co-located with the gateway 40, thereby foregoing the need for an external network connecting a gateway to a server. The co-location of a gateway 40 with a server 14, especially when combined into a unitary component, is sometimes referred to as a "gateway controller" and is illustrated, for example, in the detection system 110 of FIG. 2.

Notably, although reference is made generally only to "Global Positioning System" or "GPS," it will be apparent to the Ordinary Artisan that the present invention is equally applicable to other satellite navigation systems, including the Russian system "GLONASS" and the European Space Agency's "Galileo" system.

Figure 3:
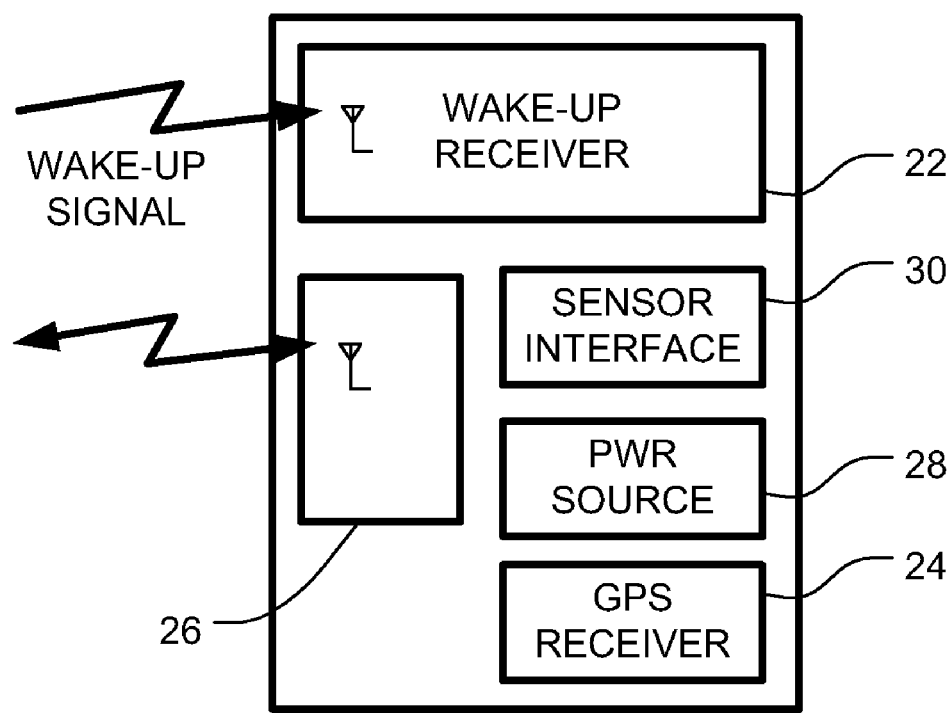
FIG. 3 is a block diagram of an exemplary GPS radio for use in the system of FIG. 1.

Turning now to FIG. 3, a GPS radio 20 according to preferred embodiments of the present invention is diagrammatically shown to include: a GPS receiver 24 for calculating the position of the GPS radio 20 and, thus, the position of the individual or asset carrying the GPS radio 20; a standards based radio 26 for two-way wireless communications with, for example, one or more other GPS radios 20 and/or a GPS gateway 40; and an electrical power source 28, such as a battery. As described further below, the GPS radio 20 further includes radio frequency ranging capability in order to determine the distance between it and another wireless communication device 20,40.

Figure 4:
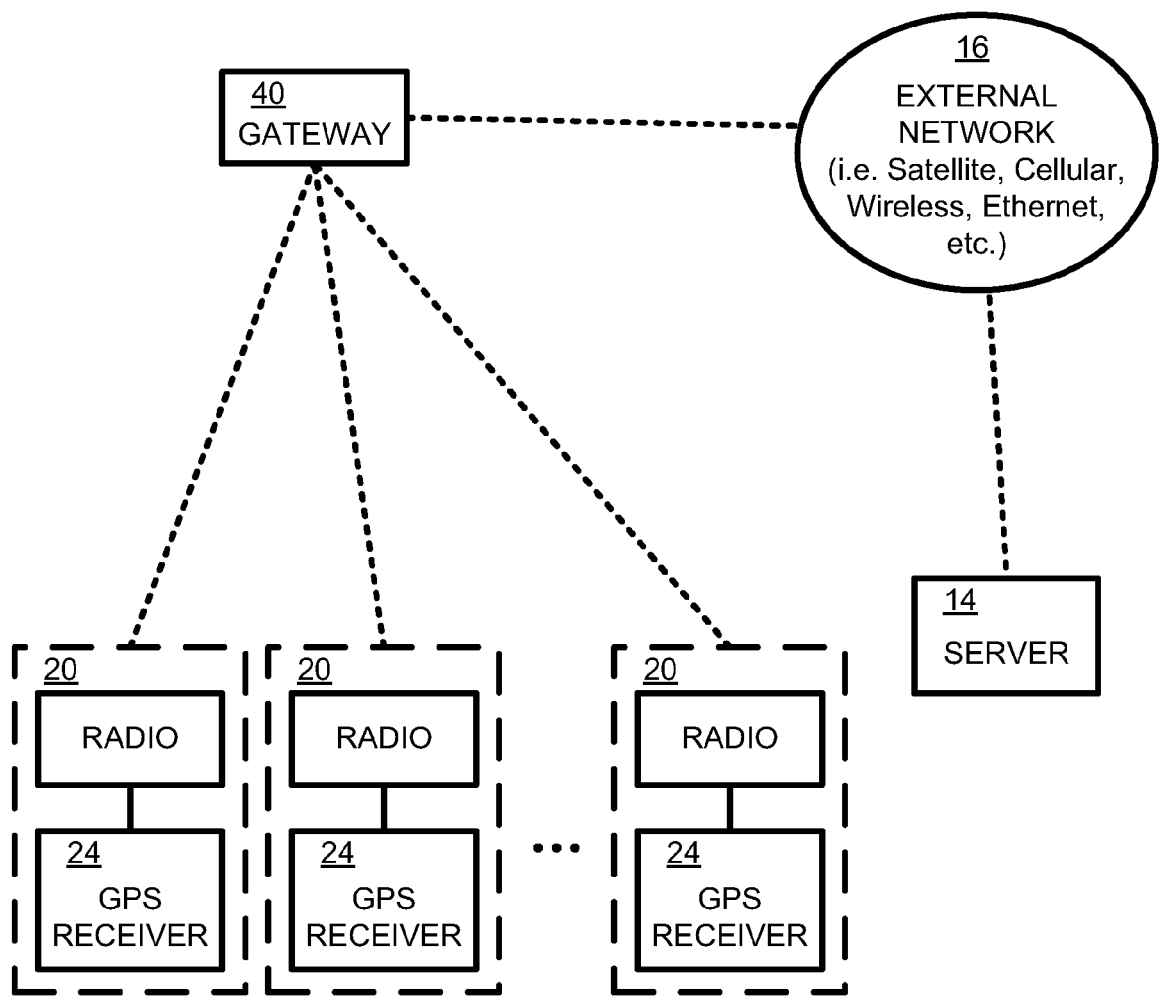
FIG. 4 is a block diagram of yet another GPS locator system.

As shown in FIGS. 1 and 3, the GPS receiver 24 is incorporated directly into the GPS radio 20 and, as such, a separate interface between the respective components is not illustrated. Alternatively, however, a GPS receiver 24 may be physically separated from, but disposed in electronic communication with, the other portions of a GPS radio 20, thereby providing generally similar functionality to the arrangement depicted in FIGS. 1 and 2. Such an arrangement is shown, for example, in the detection system 210 of FIG. 4. In this respect, the GPS receiver 24 and the other portions of the GPS radio 20 may be contained in separate housings, and electronic communication between the GPS receiver 24 and the other portions of the GPS radio 20 may be effected wirelessly or by way of cabled connections.

Optionally, the GPS radio 20 may further include a sensor interface 30 for acquiring data from one or more sensors associated with the GPS radio 20. Such a GPS radio 20 may sometimes be referred to as a "GPS-RSI" radio, or a "GPS-RSI." Insofar as the GPS radio 20 is associated with military equipment and personnel assets, such individual servicepersons, operational units or vehicles, or other equipment carrying or supporting personnel or equipment, the GPS-RSI radio 20 preferably is configured to interface with sensors that, for example, monitor the assets, environmental characteristics of the assets, and/or geographical locations of the assets. In some embodiments, such sensors may actually be included as components integral with the GPS-RSI radio 20; in other embodiments, such sensors may be external to the GPS-RSI radio 20 but nevertheless disposed in electronic communication with the sensor interface for data exchange therebetween. Electronic communication between the sensor interface and a sensor is exchanged wirelessly in some embodiments and by way of cabled connections in other embodiments. In at least one embodiment, the sensor interface comprises a multiconductor connector, such as a ribbon cable, that passes from the interior of a GPS-RSI radio 20 to an external sensor, sensor array, or docking station that receives the GPS-RSI radio 20. Exemplary sensors include, but are not limited to, electronic seals, magnetic seals, cameras, microphones, temperature sensors, humidity sensors, radiation sensors, and motion sensors.

Optionally, the GPS radio 20 also may include a "Wake-Up Receiver" 22 for receiving wireless signals. This permits the standards based radio 26, which has a relatively high power consumption rate when active, to reduce unnecessary power consumption by remaining generally dormant until awakened. The Wake-Up Receiver 22, which has a relatively low power consumption rate compared to that of the standards based radio 26, generally remains active for detecting incoming wireless wake-up signals. Upon receipt of a wake-up signal intended for the GPS radio 20, the Wake-Up Receiver 22 generally wakes-up the standards based radio 26 for receiving and transmitting data via the standards based radio 26. Those components of the GPS radio 20 that consume relatively high amounts of power thereby are generally active only when needed.

Such a Wake-up Receiver 22 generally includes components for receiving wireless wake-up signals. The Wake-Up Receiver 22 may be generally similar in function to the "WT Component" described in detail, for example, in incorporated International Patent Application Publication No. WO 03/098851 A1 (and which international application entered the U.S. national phase and published as U.S. Patent Application Publication No. US 2005/0215280, also incorporated herein by reference). The Wake-Up Receiver 22 moreover has been occasionally referred to as a "tag turn-on circuit," a "TTOC" or a "Wake-Up Rx." The process for determining whether to wake-up the standards based radio of the GPS radio 20 furthermore may include a number of steps that are performed in a particular sequence, especially if the GPS radio 20 is disposed in a noisy radio-frequency (RF) environment. For example, such a wake-up sequence is described in the disclosure of U.S. patent application Ser. No. 11/421,321, pending which is hereby incorporated herein by reference.

Figure 5:
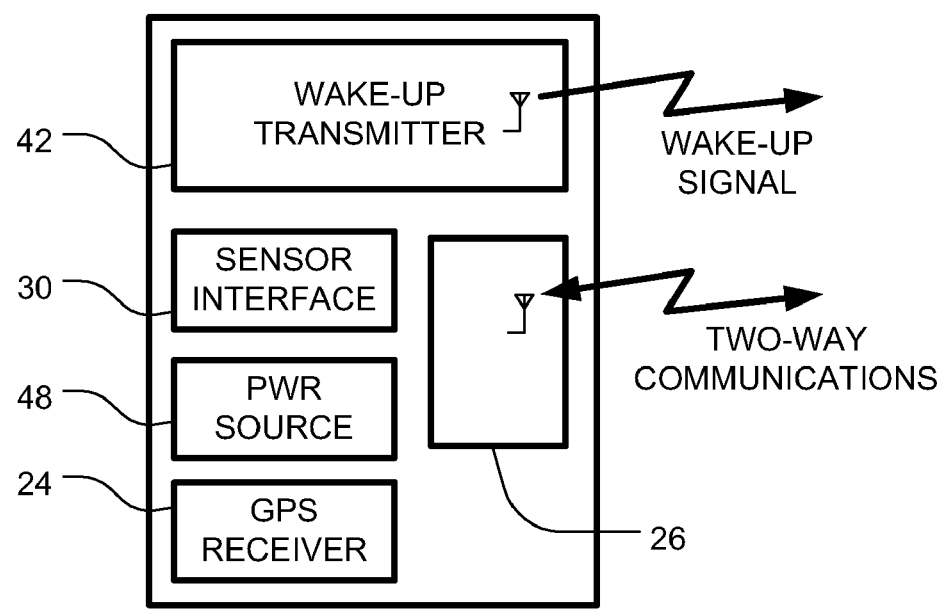
FIG. 5 is a block diagram of an exemplary GPS gateway for use in the system of FIG. 1.

Turning now to FIG. 5, a GPS gateway 40 may include: a GPS receiver 24 for calculating the position of the GPS gateway 40; a standards based radio 26 for two-way wireless communications with one or more GPS radios 20 and/or one or more other gateways; and an electrical power source 48, such as a battery. As described further below, the GPS gateway 40 further includes radio frequency ranging capability in order to determine the distance between it and another wireless communication device 20,40. The GPS gateway 40 may also include a sensor interface 30 for acquiring data from one or more sensors associated with the GPS gateway 40.

Optionally, the GPS gateway 40 may further include a "Wake-Up Transmitter" 42 for transmitting wireless wake-up signals. The Wake-Up Transmitter 42 has occasionally been referred to as a "tag turn-on," a "TTO" or a "Wake-Up Tx," and the Wake-Up Transmitter 42 is configured to send signals to Wake-Up Receivers 22, TTOCs, or the like, for wake-up of GPS radios 20. In at least one other embodiment (not shown), a GPS gateway may include a Wake-Up Receiver 22 like those included in the GPS radios 20, either in place of or in addition to the Wake-Up Transmitter. In such embodiment, the Wake-Up Transmitter is further configured to send signals to GPS gateways.

The GPS radios 20 are programmed to communicate directly with the GPS gateway 40 or to communicate via hopping. Furthermore, fewer GPS gateways are needed to cover an area when the GPS radios 20 communicate via hopping to reach a GPS gateway 40. The GPS gateway 40 facilitates communication between one or more wireless networks, formed by the GPS radios 20, and the external network

16. As such, the GPS gateway 40 further includes one or more appropriate connections for communicating with such an external network 16, such connections including but not limited to network interfaces for mobile phone, WiFi, two-way radio, secure radio links, Ethernet, and/or satellite communications. Each GPS gateway 40 thus serves as an access point or gateway for communications with the external network 16. Electronic communication between the network interface and the external network 16 may be exchanged wirelessly or by way of cabled connections. The external network 16 may include wired or wireless communications using any of the foregoing technologies or combination thereof, as well as any other appropriate communication technologies. Additionally, the external network 16 may incorporate use of the Internet or some other wide area network (WAN).

Figure 6:
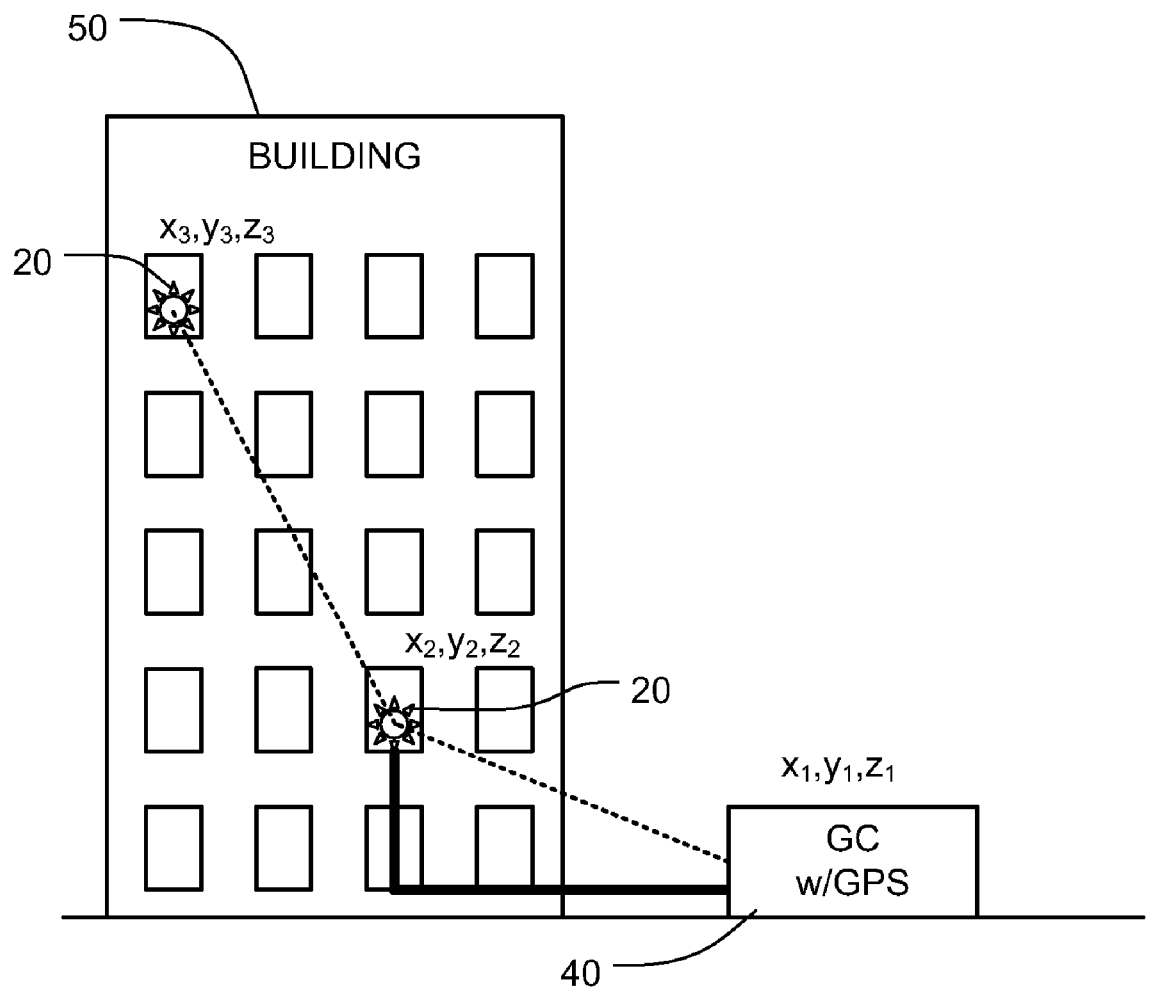
FIG. 6 illustrates a first operational mode in which a locator system is used to locate a GPS radio in a building.
Figure 6:

FIGS. 6-11 are schematic diagrams of locator systems in accordance with one or more preferred operational modes of a system of the present invention. For example, FIG. 6 illustrates a first operational mode in which a system 10 is used to locate a GPS radio 20 in a multistory building 50. In this operational mode, the detection system 10 generally comprises a plurality of GPS radios 20 and a GPS gateway 40. As described previously, each GPS radio 20 includes a standards based radio 26 and a GPS receiver 24. As shown, the GPS radios 20 and the GPS gateway 40 are the communication nodes of an ad hoc wireless network. In the situation illustrated in FIG. 6, the GPS gateway 40 is in direct communication with a first GPS radio 20, and the first GPS radio 20 is in direct communication with a second GPS radio 20. However, the GPS gateway 40 communicates with the second GPS radio 20 only by hopping.

In operation, the GPS radios 20 are carried into or otherwise located in an environment such as a building 50, while the GPS gateway 40 is stationed adjacent the building 50. The GPS gateway 40 is preferably positioned in a location with reliable GPS access and with reasonable access to other communication systems located external to the building. No particular location is generally required or preferred for the GPS radios 20, because each must typically move with the firefighter, police officer, serviceperson or the like that is carrying it.

As shown, the physical location of each wireless communication device 20,40 may be described or characterized via a coordinate system. For example, each device 20,40 may be described using a conventional Cartesian coordinate system having three mutually perpendicular axes such as an X axis, Y axis, and Z axis. In such a coordinate system, a location of an object may be identified by a (x,y,z) position. As will be evident, such a coordinate system may be approximated, at least locally, using conventional latitude, longitude and elevation (or "z") coordinates. Of course, from a global perspective, such a system is not a Cartesian coordinate system, but for the purposes described herein, such an approximation is acceptable. Thus, for example, the coordinates of the GPS gateway 40 as illustrated are $(x_1,y_1,z_1)$, the coordinates of the first GPS radio 20 are $(x_2,y_2,z_2)$, and the coordinates of the second GPS radio 20 are $(x_3,y_3,z_3)$.

As the GPS radios 20 are carried through the building 50, the GPS receiver 24 on each respective GPS radio 20 and GPS gateway 40 calculates, on a continuous or periodic basis, its position according to conventional means, i.e., standard GPS techniques. Notably, although a GPS receiver 24 of the GPS radios 20 may be configured to calculate the azimuth or z-axis coordinate, the GPS receivers 24 of the GPS radios 20 generally are unable to accurately determine the azimuth or z-axis coordinate because of the inability to "see" a sufficient number of GPS satellites. This problem is exacerbated by the building 50 in which the GPS radios 20 are carried. Accordingly, such calculation of the azimuth or z-axis is generally ignored. The position of a GPS radio 20 on a horizontal plane (i.e., "X-Y" plane), however, can generally be calculated accurately. Nonetheless, the determination of a GPS radio's absolute or relative position on the z-axis is critical in some applications. For example, a firefighter may lose his way or become incapacitated as he moves in the building 50, and it may be necessary to find, guide or rescue the firefighters In such a situation, information about the firefighter's vertical position may become critical in order to determine, for example, the floor of the building on which the firefighter is located.

According to preferred embodiments of the present invention, information about the firefighter's vertical location may be determined as follows.

First, the (x,y) coordinates are determined for the firefighter's GPS radio 20 and for the GPS gateway 40. As illustrated, these coordinates are $(x_1,y_1)$ for the GPS gateway 40 and $(x_2,y_2)$ for the first GPS radio 20. Preferably, each respective device determines its (x,y) coordinates using the respective GPS receivers of the devices. Furthermore, it is assumed in this example that the firefighter is carrying the first GPS radio 20.

Figure 7:
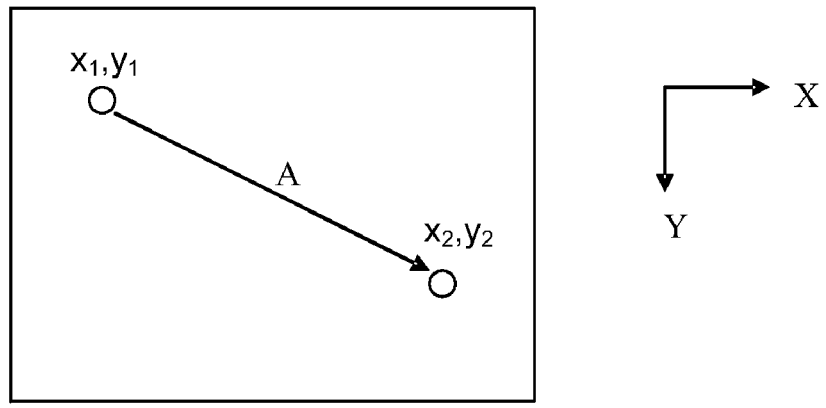
FIG. 7 is a schematic diagram illustrating a portion of the location process.

FIG. 7 is a schematic diagram illustrating a portion of the location process. As illustrated, the distance A within a horizontal plane between the two devices 20,40 may be calculated as the hypotenuse of a right triangle using the Pythagorean theorem, wherein the lengths of the two other sides of the triangle are determined using the (x,y) GPS coordinates calculated by the respective GPS receivers 24.

Figure 8:
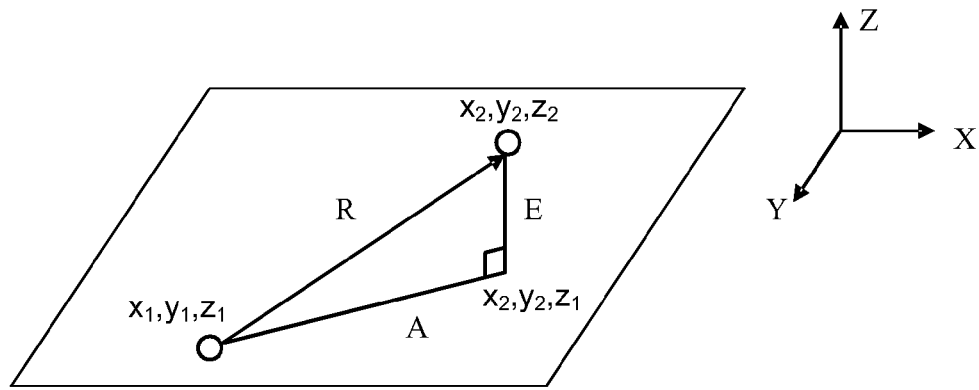
FIG. 8 is a schematic diagram illustrating another portion of the location process.

Next, with reference to FIG. 8, radio frequency ranging of the two wireless communication device 20,40 may be used to determine the absolute distance therebetween, which is denoted R. As stated previously, each GPS radio 20 and each GPS gateway 40 includes radio frequency ranging capability for determining the distance between it and another for purposes made clear below. Such ranging capability may be provided using the Wake-Up Receivers 22/Wake-Up Transmitters 42 and/or the standards based radios 26 on respective wireless communication devices 20,40. Ranging may be accomplished using lasers, infrared, sound, and the like. Various conventional ranging techniques are available including RF power level measurements or time of arrival techniques. Typically, a time of arrival method is more accurate but other methods can be used.

Once the distance A between the two devices 20,40 in the horizontal plane and the absolute distance R between the two devices 20,40 have been determined, the elevational differential between the GPS gateway 40 and the first GPS radio 20, i.e., $(z_2-z_1)$, may be determined as shown in FIG. 8, which is a schematic diagram illustrating another portion of the location process. As illustrated, the absolute distance R is the length of the hypotenuse of a second right triangle, wherein the length one of the other sides is the distance A in the horizontal plane and the length of the other side represents the elevational differential E between the GPS gateway 40 and the first GPS radio 20. The Pythagorean theorem may thus be used once again, this time to calculate the elevational differential E between the two devices 20,40.

Because the process thus far described determines only the absolute magnitude of the elevational differential between the two devices 20,40, one additional step may be necessary at this point. More particularly, it may be necessary or desirable to determine whether the elevational differential is in the upward or downward direction. This may be done, for example, using the GPS azimuth, which although too inaccurate to be used reliably to determine the magnitude of the differential, is reliable enough to determine whether the differential is in the positive or negative direction. Other sensors can be used for such purposes, such as antenna arrays or direction antennas to determine angle of arrival.

The process may thus be summarized as follows. As shown in FIGS. 7 and 8, (x,y) positions of the two wireless communication devices 20,40 are calculated using GPS. The horizontal distance A then can be calculated. Once the horizontal distance A is calculated, the elevational differential E can be calculated by using the equation $R^2=A^2+E^2$. Other methods can be used to more accurately calculate the elevation, which may include certain corrective fine tuning, but the aforementioned approach is the simplest and preferred method.

FIG. 9A illustrates a second operational mode in which a system 10 is once again used to locate a GPS radio 20 in a building 50. In this operational mode, the detection system 10 comprises a plurality of GPS radios 20 and a gateway controller 40. Notably, the gateway controller 40 may or may not be a GPS gateway in this operational mode. As shown, the GPS radios 20 and the gateway controller 40 are the communication nodes of an ad hoc wireless network. In the situation illustrated in FIG. 9A, the gateway controller 40 is in direct communication with the first GPS radio 20, and the first GPS radio 20 is in direct communication with the second GPS radio 20. However, the gateway controller 40 communicates with the second GPS radio 20 only by hopping.

The operational mode of FIG. 9A is similar to that of FIGS. 6-8 except that the elevational differential being determined is the one between the first GPS radio 20 and the second GPS radio 20, i.e., $(z_3-z_2)$, and thus the wireless communication devices 20,40 for which the elevational differential is determined are both GPS radios 20. The methodology generally is the same, with the horizontal distance A being determined using the (x,y) coordinates calculated by the GPS receivers 24 of the two GPS radios 24, with ranging being used to determine the absolute distance R between the two GPS radios 20, and with the Pythagorean theorem being applied twice to determine the elevation E representing the elevational differential between the two GPS radios 20, i.e., $(z_3-z_2)$.

Notably, it will be apparent to the Ordinary Artisan that the presence or use of a GPS gateway 40, or even a gateway controller as shown in FIG. 9A, is not required in the second operational mode. In other words, a gateway 40 may or may not be present in order for the first GPS radio 20 to be utilized to determine the elevational differential between it and the second GPS radio 20. This is illustrated in FIG. 9B, wherein the two GPS radios 20 are serving as the communication nodes of an ad hoc wireless network but where no GPS gateway/gateway controller 40 is being used. The methodology used to accomplish the determination of elevational differential in FIG. 9A is thus identical to the methodology that is used in the system and operational mode shown in FIG. 9B.

Although the present invention works in urban environments and mountainous terrain, it is particularly useful when supplemented with network aiding for the GPS receivers 24 to help the GPS receivers 24 determine their (x,y) position. Network aiding a GPS receiver 24 is somewhat vendor-specific, but in general it is accomplished by providing Almanac, Ephemeris, GPS time, approximate location and other pertinent information to a GPS receiver 24 to increase the sensitivity and/or accuracy of the GPS receiver 24.

Also notably, the methods of the present invention may be further employed as a preliminary step in determining the elevation of a wireless communication device, such as a GPS radio 20, relative to a more fixed elevation, such as the ground outside a building or elevation above sea level. For example, if the height of a first wireless communication device, such as the GPS gateway 40 of FIG. 6, is known or may be estimated relative to the ground outside the building, then the relative elevational differential of the second wireless communication device, such as one of the GPS radios 20 inside the building 50, may be calculated by adding the relative elevational differential between the two wireless communication devices to the height of the GPS gateway 40 above the ground. For example, if the GPS gateway 40 is mounted on a fire truck six feet off the ground, the six feet may be added to the relative elevational differential determined by the methods described herein in order to determine the actual elevation, relative to the ground, of the a GPS radio 20 located somewhere inside the building 50. Similarly, if the actual elevation above sea level of the first wireless communication device is known or can be estimated, then the elevation above sea level of the second wireless communication device may be calculated by adding the relative elevational differential between the two wireless communication devices to the elevation above sea level of the GPS gateway 40.

FIG. 10 illustrates a third operational mode in which a system 10 is once again used to locate a GPS radio 20 in a building 50. In this operational mode, the detection system 10 once again comprises a plurality of GPS radios 20, a GPS gateway 40, an external network 16, and a server 14. As shown, the GPS radios 20 and the GPS gateway 40 again comprise communication nodes of an ad hoc wireless network. The situation illustrated in FIG. 10 is similar to that of FIG. 6, wherein the GPS gateway 40 is in direct communication with the first GPS radio 20, and the first GPS radio 20 is in direct communication with the second GPS radio 20, but the GPS gateway 40 communicates with the second GPS radio 20 only by hopping. Further, in this illustration, the gateway 40 is not co-located with the server 14.

As noted in FIG. 10, the server 14 may provide a variety of assistance to the other components of the locator system 10. As previously discussed, the server 14 may provide network aiding, helping the GPS receivers 24 determine their respective (x,y) position. The server 14 may also help provide more accurate calculation of elevational information. Further, the server 14 may provide mapping software that may be used to track and locate GPS radios 20 within the building 50 or in other environments. Still further, the server 14 may provide voice translation.

FIG. 11 illustrates a fourth operational mode in which a system 10 is once again used to locate a GPS radio 20 in a building 50. In this operational mode, the detection system 10 once again comprises a plurality of GPS radios 20, a GPS gateway 40, an external network (not shown), and a server (not shown). As shown, the GPS radios 20 and the GPS gateway 40 again comprise communication nodes of an ad hoc wireless network. The situation illustrated in FIG. 11 is similar to that of FIGS. 6 and 10, wherein the GPS gateway 40 is in direct communication with the first GPS radio 20, and the first GPS radio 20 is in direct communication with the second GPS radio 20, but the GPS gateway 40 communicates with the second GPS radio 20 only by hopping. Further, in this illustration, the gateway 40 is integrated with the server 14. Of course, as will be apparent to the Ordinary Artisan, the server 14 may merely be located with the gateway 40 but not integrated directly therein.

FIG. 12 illustrates a fifth operational mode in which a locator system 10 is used to locate a GPS radio 20 in a building 50. In this operational mode, the detection system 10 once again comprises a plurality of GPS radios 20, a GPS gateway 40, an external network 16, and a server 14. As shown, the GPS radios 20 and the GPS gateway 40 again comprise communication nodes of an ad hoc wireless network. The situation illustrated in FIG. 12 is similar to that of FIGS. 6, 10 and 11, wherein the GPS gateway 40 is in direct communication with the first GPS radio 20, and the first GPS radio 20 is in direct communication with the second GPS radio 20, but the GPS gateway 40 communicates with the second GPS radio 20 only by hopping. Further, in this illustration, as with that of FIG. 10, the gateway 40 is not co-located with the server 14.

In the fifth operational mode, the methodology described previously is used as follows. The (x,y) positions of the two GPS radios 20 and the GPS gateway 40 are determined using respective GPS receivers 24. Ranging is used to determine the distance between the GPS gateway 40 and the first GPS radio 20 and the distance between the first GPS radio 20 and the second GPS radio 20. A first relative elevational differential can then be determined between the GPS gateway 40 and the first GPS radio 20, and a second relative elevational differential can be determined between the first GPS radio 20 and the second GPS radio 20. The relative elevational differential between the GPS gateway 40 and the second GPS radio 20 can then be determined by combining the first and second relative elevational differentials found in the preceding step.

FIG. 13 illustrates a sixth operational mode in which a locator system 10 is used to locate a GPS radio 20 in a building 50. In this operational mode, the detection system 10 once again comprises a plurality of GPS radios 20, a GPS gateway 40, an external network 16, and a server 14. As shown, the GPS radios 20 and the GPS gateway 40 again comprise communication nodes of an ad hoc wireless network. However, in the situation illustrated in FIG. 13, unlike previously illustrated situations, the GPS gateway 40 and the two GPS radios 20 are all in direct communication with one another. Further, in this illustration, as with that of FIG. 10, the gateway 40 is not co-located with the server 14.

In the sixth operational mode, the methodology described with regard to FIG. 12 may be used to determine, indirectly, the relative elevational differential between the GPS gateway 40 and the second GPS radio 20. In addition, the methodology described with respect to FIG. 6 may be applied to determine the relative elevational differential between the GPS gateway 40 and the second GPS radio 20 directly. The two methods may then be compared and combined, as appropriate, to determine a potentially more accurate calculation of the actual relative elevational differential. In this regard, such comparison and combination may be carried out with or without assistance from the server 14.

As described previously, power consumption may be reduced through use of wake-up technology. Reduction in unnecessary power consumption may also be achieved by utilizing common designation ad hoc networks such as, for example, class-based networks. Common designation networking is disclosed, for example, in U.S. patent application Ser. No. 11/161,539, which published as U.S. Patent Application Publication No. 2006/0023678 A1, each of which is hereby incorporated herein by reference. Class based networking can be used to help aid other radios that need location. The operation would be to send out a signal to communicate with radios that have acquired a GPS position. If a radio has acquired the position, a class called GPSPositionAvailable could be added to the list of valid classes the radio responds to and setup a communication. The network aiding information can be transferred to the original radio so that the (x,y) coordinates can be calculated. Once that has been achieved, the range between the radios can be determined and the elevation calculated. The reverse could also be setup by setting up a class of radios that need network aid such as GPSPositionUnavailable and having a radio that has already acquired the position to pass it along once it is ready.

A number of benefits are apparent from the foregoing. In general, the systems and methodologies described and illustrated herein may be used to track and/or position any asset to which a GPS radio 20 may be attached, carried or the like. More particularly, the systems and methodologies described and illustrated herein make it possible to accurately calculate the relative position of GPS radios 20 in buildings 50 or other urban environments, as well as in mountainous locations, in all three directions, i.e., along the X, Y and Z axes. In this regard, it is possible to calculate the position of a GPS radio 20 relative to the ground directly, indirectly via hopping radios, or both. Significantly, many of the methodologies described herein can be carried out using only two wireless communication devices 20,40, rather than requiring three, four or more for conventional triangulation. Specific applications of the systems and methodologies described herein include very accurate tracking of the position of stacked assets such as cars for parking lots and car dealers, determining the precise location of a wounded comrade by servicepersons looking for him in an urban combat area or a mountainous combat area, and determining the precise location of a colleague lost in a building 50 where they are fighting a fire.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of determining the floor of a building, on which a first person carrying a first wireless communication device is located, using a second wireless communication device, the method comprising the steps of:
    (a) determining, utilizing electronics of a first wireless communication device, an (x,y) position of the first wireless communication device;
    (b) determining, utilizing electronics of a second wireless communication device, an (x,y) position of the second wireless communication device;
    (c) determining, utilizing electronics of the first wireless communication device or electronics of the second wireless communication device, a distance between the first wireless communication device and the second wireless communication device; (d) communicating, from the second wireless communication device to the first wireless communication device, the determined (x,y) position of the second wireless communication device; and
    (e) determining, utilizing electronics of the first wireless communication device, a relative elevational differential between the first wireless communication device and the second wireless communication device based on,
    (i) the determined (x,y) positions of the first and second wireless communication devices, and
    (ii) the determined distance between the first and second wireless communication devices;
(f) determining a number of floors corresponding to the relative elevational differential between the first wireless communication device and the second wireless communication device;
(g) wherein the determined relative elevational differential is an absolute magnitude, the method further comprising the step of determining, separately from the determination of the relative elevational differential, the direction, relative to the first wireless communication device, in which the determined relative elevational differential is to be applied.

2. The method of claim 1, wherein the first person is a first responder.

3. The method of claim 1, wherein the first person is a firefighter.

4. The method of claim 1, wherein the first person is a serviceperson.

5. The method of claim 1, further comprising the step of determining a relative elevational differential between the second wireless communication device and a floor of the building on which a second person, carrying the second wireless communication device, is located.

6. The method of claim 5, further determining the floor, of the building, on which the first person is located, on the basis of the floor on which the second person is located and the determined relative elevational differential between the first wireless communication device and the second wireless communication device.

7. The method of claim 1, wherein the (x,y) position of the first wireless communication device is determined using a satellite navigation system.

8. The method of claim 7, wherein the satellite navigation system is GPS.

9. The method of claim 1, wherein the (x,y) position of the second wireless communication device is determined using a satellite navigation system.

10. The method of claim 1, wherein the distance between the first wireless communication device and the second wireless communication device is determined using radio frequency ranging.

11. The method of claim 1, wherein the relative elevational differential between the first wireless communication device and the second wireless communication device is determined by calculating the square root of,
    (i) the square of the determined distance between the first wireless communication device and the second wireless communication device less,
    (ii) the square of the distance in the X-Y plane between the first wireless communication device and the second wireless communication device.

12. The method of claim 1, wherein determining at least one of the respective steps of determining an (x,y) position of the first and second wireless devices is carried out with the assistance of network aiding to help in the determination of an (x,y) position.

13. A method of determining the location of an asset carrying a first wireless communication device relative to a second wireless communication device, the method comprising the steps of:
    (a) determining, utilizing electronics of a first wireless communication device, an (x,y) position of the first wireless communication device;
    (b) determining, utilizing electronics of a second wireless communication device, an (x,y) position of the second wireless communication device;
    (c) determining, utilizing electronics of the first wireless communication device or electronics of the second wireless communication device, a distance between the first wireless communication device and the second wireless communication device; (d) communicating, from the second wireless communication device to the first wireless communication device, the determined (x,y) position of the second wireless communication device; and
    (e) determining, utilizing electronics of the first wireless communication device, a relative elevational differential between the first wireless communication device and the second wireless communication device based on,
        (i) the determined (x,y) positions of the first and second wireless communication devices, and
        (ii) the determined distance between the first and second wireless communication devices;
    (f) wherein the determined relative elevational differential is an absolute magnitude, the method further comprising the step of determining, separately from the determination of the relative elevational differential, a direction, relative to the first wireless communication device, in which the determined relative elevational differential is to be applied.

14. The method of claim 13, wherein the asset is a motor vehicle.

15. The method of claim 13, wherein the asset is a motor vehicle parked on a floor of a multi-level garage.

16. The method of claim 13, wherein determining at least one of the respective steps of determining an (x,y) position of the first and second wireless devices is carried out with the assistance of network aiding to help in the determination of an (x,y) position.

17. The method of claim 13, wherein determining the direction is carried out using GPS azimuth.

18. A method of determining the floor of a building, on which a first person carrying a first wireless communication device is located, using a second wireless communication device, the method comprising the steps of:
    (a) determining, utilizing electronics of a first wireless communication device, an (x,y) position of the first wireless communication device;
    (b) determining, utilizing electronics of a second wireless communication device, an (x,y) position of the second wireless communication device;
    (c) determining, utilizing electronics of the first wireless communication device, a distance between the first wireless communication device and the second wireless communication device;
    (d) communicating, from the first wireless communication device to a third wireless communication device, the determined (x,y) position of the first wireless communication device;
    (e) communicating, from the first wireless communication device to the third wireless communication device, the determined distance between the first wireless communication device and the second wireless communication device;
    (f) communicating, from the second wireless communication device to the third wireless communication device, the determined (x,y) position of the second wireless communication device to the first wireless communication device; and (g) determining, utilizing electronics of the third wireless communication device, a relative elevational differential between the first wireless communication device and the second wireless communication device based on,
  (i) the determined (x,y) positions of the first and second wireless communication devices, and
  (ii) the determined distance between the first and second wireless communication devices;
(h) wherein the determined relative elevational differential is an absolute magnitude, the method further comprising the step of determining, separately from the determination of the relative elevational differential, a direction, relative to the first wireless communication device, in which the determined relative elevational differential is to be applied.

19. A method of determining the location of an asset carrying a first wireless communication device relative to a second wireless communication device, the method comprising the steps of:
  (a) determining, utilizing electronics of a first wireless communication device, an (x,y) position of the first wireless communication device;
  (b) determining, utilizing electronics of a second wireless communication device, an (x,y) position of the second wireless communication device;
  (c) determining, utilizing electronics of the first wireless communication device, a distance between the first wireless communication device and the second wireless communication device;
  (d) communicating, from the first wireless communication device to a third wireless communication device, the determined (x,y) position of the first wireless communication device;
  (e) communicating, from the first wireless communication device to the third wireless communication device, the determined distance between the first wireless communication device and the second wireless communication device;
  (f) communicating, from the second wireless communication device to the third wireless communication device, the determined (x,y) position of the second wireless communication device to the first wireless communication device; and
  (g) determining, utilizing electronics of the third wireless communication device, a relative elevational differential between the first wireless communication device and the second wireless communication device based on,
    (i) the determined (x,y) positions of the first and second wireless communication devices, and
    (ii) the determined distance between the first and second wireless communication devices;
  (h) wherein the determined relative elevational differential is an absolute magnitude, the method further comprising the step of determining, separately from the determination of the relative elevational differential, a direction, relative to the first wireless communication device, in which the determined relative elevational differential is to be applied.

* * * * *